Oct. 21, 1930.  E. W. DAVIS  1,779,208
LUBRICATING SYSTEM
Filed Dec. 9, 1925  2 Sheets-Sheet 1

Inventor
Ernest W. Davis
By Pierce and Sweet
Attys.

Oct. 21, 1930.　　　　E. W. DAVIS　　　　1,779,208
LUBRICATING SYSTEM
Filed Dec. 9, 1925　　　2 Sheets-Sheet 2
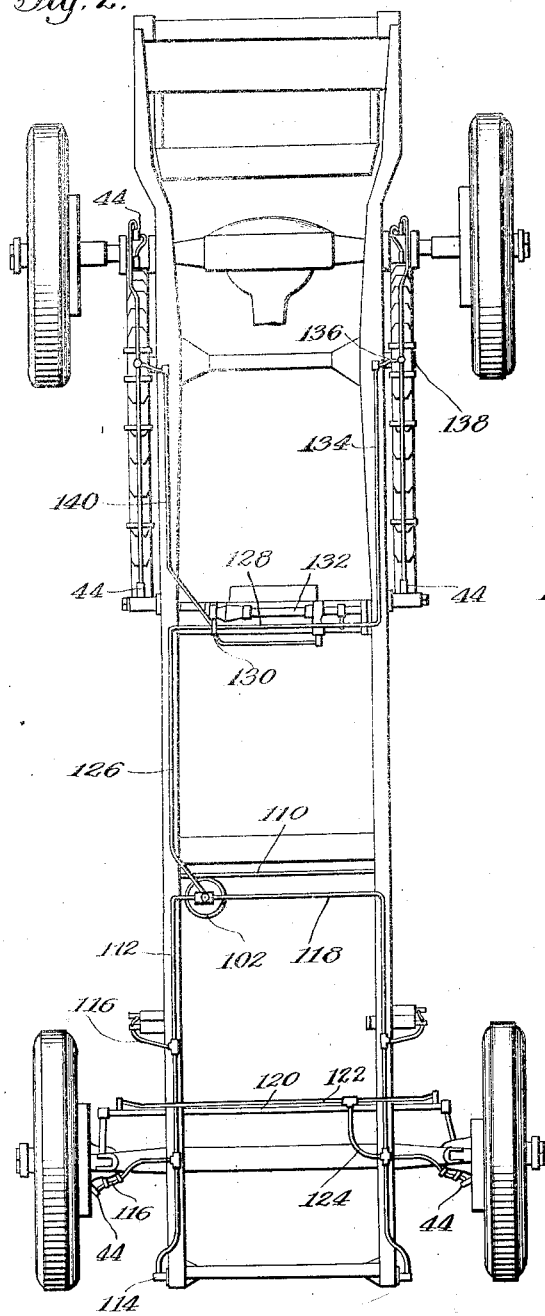
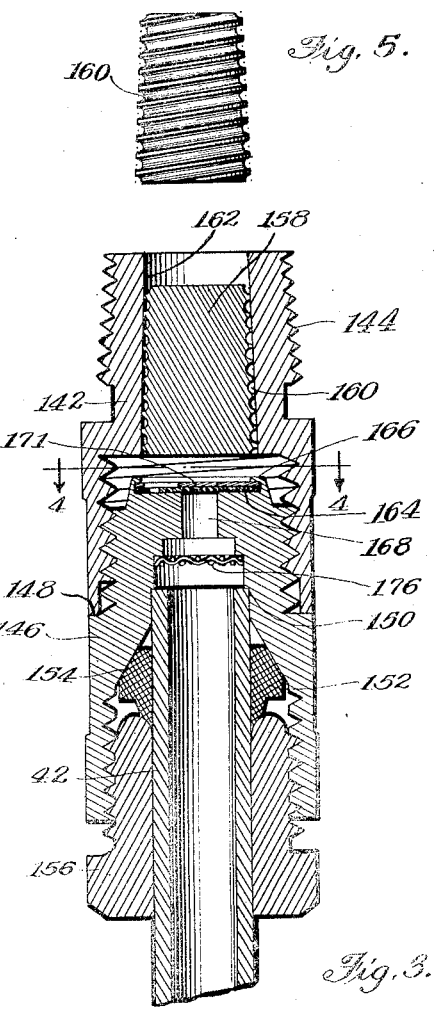
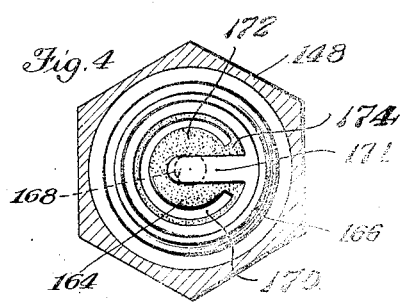
Inventor
Ernest W. Davis.
By Pierce and Sweet
Attys.

Patented Oct. 21, 1930

1,779,208

UNITED STATES PATENT OFFICE

ERNEST W. DAVIS, OF OAK PARK, ILLINOIS, ASSIGNOR TO ALEMITE CORPORATION, OF CHICAGO, ILLINOIS, A CORPORATION OF DELAWARE

LUBRICATING SYSTEM

Application filed December 9, 1925. Serial No. 74,424.

My invention relates to a lubricating system.

Among the objects and advantages of the invention may be enumerated:

First, a system operating under substantially continuous pressure with automatic means for giving each point to be lubricated the proper amount of lubricant.

Second, a system employing an inertia actuated pump having the combined capacity of developing high pressure and operating at sufficiently short intervals to maintain a substantially continuous and relatively constant delivery pressure in the system.

Third, an improved check valve for such a system, having substantially no resistance to flow in one direction and a relatively positive action in preventing return flow.

Fourth, a system employing means that will prevent drainage by gravity when the system is not kept under pressure, without interfering with apportionment of lubricant on the basis of relative resistance to flow when there is pressure.

In the accompanying drawings:

Figure 2 is a diagrammatic plan view of a motor vehicle chassis, indicating the application of such a system thereto.

Figure 3 is an axial section of the valve and resistance unit.

Figure 4 is a section on line 4—4 of Figure 3.

Figure 5 is a side elevation of a resistance plug.

Figure 1:
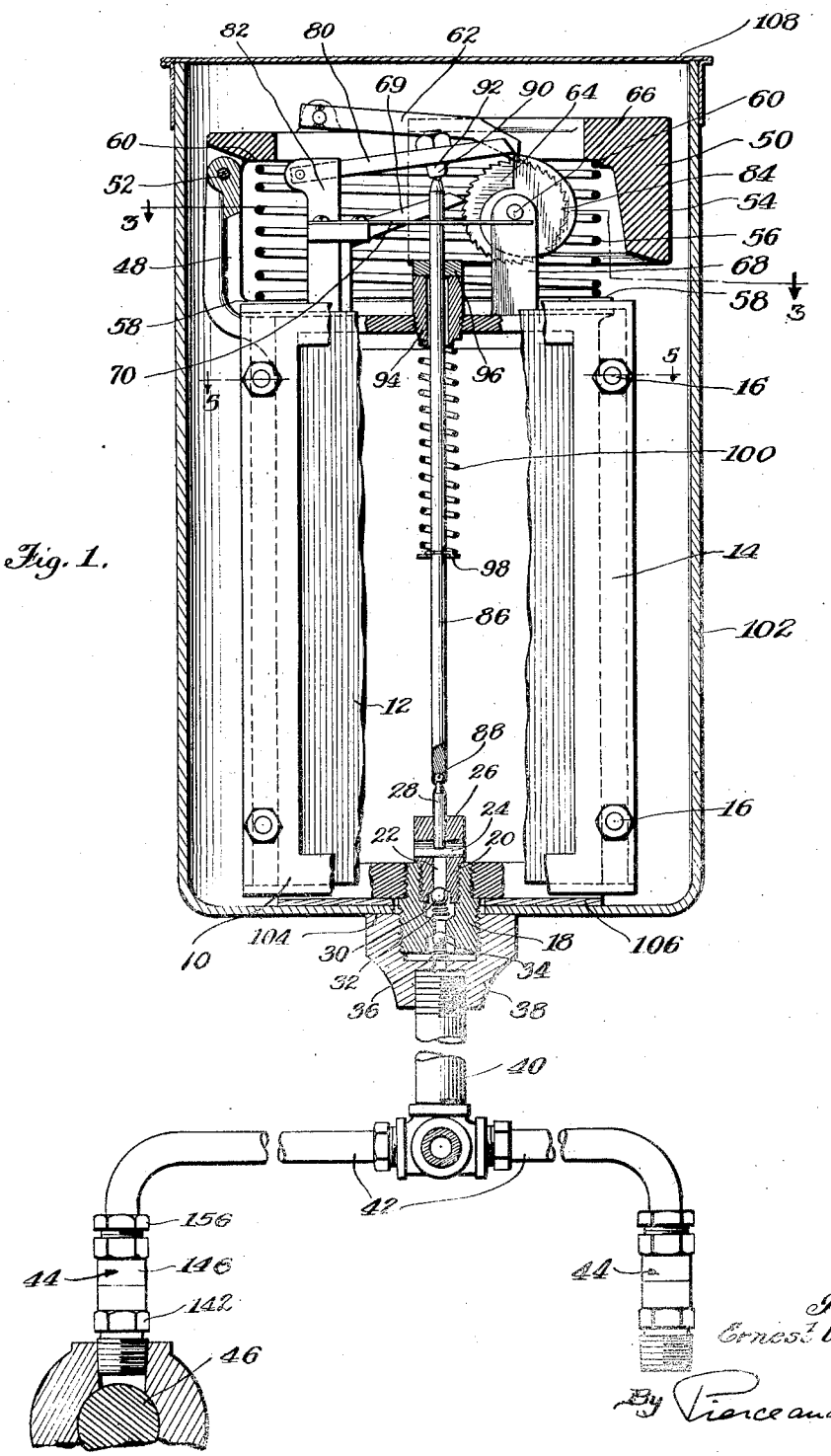
Figure 1 is a central section through a power plant and pump according to the invention with a diagrammatic showing of a distributing system.

In the embodiment of the invention selected for illustration, referring first to Figure 1, a box frame 10 is provided, with its two largest sides left open, and closed in assembly by filters 12 clamped on by means of cover plates 14 and fastening bolts 16. The frame and filters together constitute a complete enclosure with the filters as the sole means of access thereto. In the bottom of the frame I fasten an outlet plug 18 supporting a smaller cylinder plug 20 containing the cylinder 22 to which access may be had through lateral ports 24. The plug extends above the ports to form a plunger guide 26 for the stub plunger 28.

The cylinder 22 is terminated at its lower end by enlarging the bore and closing the cylinder with a ball check valve 30 held in place by a spring 32. The outlet plug 18 forms a lower seat for the spring 32 and an upper seat for a second ball check valve 34 held in place by a spring 36 resting on the connecting and clamping cap 38. From the cap 38 any suitable connection 40 runs to a distributing system diagrammatically indicated by piping 42 leading to a plurality of terminals 44 illustrated as connected to machine bearings 46 to supply lubricant thereto.

A supporting arm 48 rises from one end of the top of the frame 10 for pivotally supporting a weight 50 by means of a pintle 52. The main portion of the weight 50 is concentrated in a flange 54 depending from a portion of the periphery opposite the pintle 52. A spring 56 is housed inside the flange 54, bearing on seats at 58 on the top of the frame 10 and at 60 against the under-surface of the weight. The weight is provided with a pawl and ratchet connection comprising the pawl 62 pivoted on the weight, and the ratchet 64, for connecting it to a countershaft 66 journaled in a standard 68. A check pawl 69 prevents any retrograde movement of the ratchet 64.

The oscillations of the weight are limited and cushioned by a bifurcated leaf spring 70 having a lost motion connection with the weight as more fully set forth in my co-pending application, Serial No. 74,421, filed Dec. 9, 1925.

The transmission from the shaft 66 to the plunger 28 comprises a lever 80 pivoted on the top of the same standard 82 used to support the leaf spring 70 and the check pawl 69, with its free end riding on a cam 84 on the shaft 66. The cam 84 is shaped to raise the lever slowly and drop it abruptly once during each revolution of the shaft 66.

A connector 86 is provided with a universal joint 88 to connect it to the plunger 28 and another universal joint 90 to connect it to the lever 80 preferably through the medium of the separate universal joint member 92 mounted on the lever 80 with provision for vertical adjustment with respect thereto.

To accommodate the movement of the connector 86, the top of the frame 10 is apertured and provided with a bushing 94 having sufficient lateral clearance to permit the limited lateral movement necessitated by the linkage employed. A sealing washer 96 has a loose sliding fit on the connector 86 and slides laterally on the top of the bushing 94. Between the bottom of the bushing and a suitable abutment at 98 on the connector 86 I position a compression coil spring 100 of small diameter. In one commercial device according to the invention, I have employed a spring 100, which, while the actual force generated is relatively small, is capable of developing a pressure of approximately one hundred pounds per square inch in the cylinder 22, due to the small area of the cylinder.

The frame 10 and the power plant on top of it are all set in a container 102 clamped at 104 between the cap 38 and the bottom of the frame, a packing gasket 106 being provided to assure a tight seal. The enclosure is completed at the top by a cover 108.

When the entire device is mounted on any support subject to either regular or irregular displacements in the general direction of the connector 86, the excursions of the weight 50 will drive the transmission to store energy in the spring 100 during one complete rotation of the shaft 66, and then suddenly release it in to produce a charge of material issuing from the cylinder 22 under a pressure as great as may be necessary to force the system to receive the same. More particularly, when the device is mounted on the body of a motor vehicle, and the vehicle driven over an ordinary road surface, the excursions of the weight will be sufficiently frequent and extensive to produce a stroke of the plunger every hundred yards or so. With a system of lubricating pipes 42 extending to all the chassis bearings requiring lubrication, the capacity of the piping system and the damping of the irregular movement therein due to the inertia and viscosity of the liquid, will be such that the fittings 44 will experience a substantially uniform pressure impulse. The same uniform delivery pressure would obviously obtain in any other receiving system having sufficient capacity or damping properties or both, and almost any ordinary receiving system for the output of such a pump can readily be designed to have sufficient capacity for this purpose.

Referring now to Figure 2, I have illustrated a single unit according to Figure 1 delivering lubricant to substantially all the chassis bearings of a motor vehicle. The unit is mounted under the hood just in front of the dash 110. In the system illustrated, the pipe 112 runs forward along the right frame channel to the bolt at 114 for the front end of the right front spring. Flexible branched tubes 116 lead from this pipe to the shackle bolt for the rear end of the right front spring and to the steering knuckle and front wheel brake at the right end of the front axle. Similarly, a main tube or header 118 crosses over and runs forward along the left frame channel. The steering drag-link 120 carries a cross conduit 122 for lubricating the connections at both ends thereof, and may be connected by a flexible conduit 124 with either the header 112 or the header 118. The entire rear portion receives lubricant through a single header 126 crossing the frame at 128 where it is tapped at 130 to lubricate the cross shaft 132, forming part of the brake system. The left rear spring and bearings associated therewith receive lubricant through an extension 134 flexibly connected at 136 to the spring at its central support 138, and a similar extension 140 tapped onto the header at 130 to lubricate the right rear spring and associated bearings in the same way.

At each bearing, or other point to be lubricated, one of the fittings 44 is provided. Each of these comprises a terminal 142 having pipe threads at 144 to thread it into a hole tapped in the bearing. An intermediate sleeve 146 is threaded to the terminal 142 by machine threads, with an abutment shoulder at 148. This sleeve receives the end of the conduit 42, which abuts a stop at 150 and is clamped in place by the clamping ring 152 pinched between a conical surface 154 on the sleeve 146 and the end of the clamping nut 156.

The control means provided comprises a resistance plug 158, having a slight taper and a spiral groove 160 in its outer surface. This plug is jammed into the tapered bore 162 of the terminal 142, thereby forming a spiral passage of great length and small cross section, which will offer a resistance to flow increasing very rapidly with the rate of discharge. It will, however, be obvious that as the rate of discharge decreases toward zero the resistance offered also decreases and will not exist when there is no flow.

In series with the flow resistance plug 158 I provide a check valve. This comprises a fabric disc 164 lying in a shallow pocket in the end of the sleeve 146 and retained in place by crimping in the thin edges of the pocket at 166. The valve 164 covers the end of the relatively small discharge opening 168 in the sleeve 146 and is cut away in the form of an arcuate slit 170 separating the central leaf 172 from the remainder of the disc except for a relatively narrow connecting tongue 174.

The fabric I have found most satisfactory is a fine silk known as empire cloth, coated with linseed oil, oxidized and hardened. In this cloth the fabric is very diaphanous, functioning primarily as a binder for the linseed oil. On this account it is readily punched into discs. It is waterproof, oil proof and does not age or stiffen.

The drawing, in Figure 3, is on a much enlarged scale. In one embodiment of the invention according to Figure 3 the diameter of the valve 164 is only three-sixteenths of an inch. It will be seen that the leaf 172 will yield to a practically negligible pressure impulse communicated through the opening at 168 to permit a discharge to occur. The rates of flow are so slow that the leaf need only move very slightly, perhaps less than its own thickness, to accommodate the discharge. When the pressure impulse ceases, as when the car is at rest, any tendency toward return flow will quickly suck the leaf 172 tightly against the opening at 168 to form a positive seal up to a pressure limited only by the strength of the material of the valve. I believe that mere stoppage of flow results in closure of the valve by capillary action between the valve and the adjacent end of the member 146.

In such a system as that of Figure 2, valves according to Figures 3 and 4 are necessary primarily to prevent the system from emptying itself by gravity through the lowest bearing of the system while the car is at rest. It will be obvious that the pressures generated by this gravity action are such that the valve shown is of ample strength to withstand them. To improve the reliability of the valves and flow resistance in operation I prefer to provide an individual filter unit 176 set in the sleeve 146 between the end of the conduit 42 and the passage 168.

In a system according to the invention, in good running condition it will frequently occur that, while the pump is capable of developing pressures up to, say one hundred pounds per square inch, the rate at which the pump will force lubricant into the system, and the flow resistance properties of all the plugs 158, will be such that lubrication will take place over considerable periods of time with pressures in the system perhaps not greater than three or four pounds per square inch. It will be obvious that if the common type of spring pressed ball check valve were employed instead of the check valve shown, the main resistance in the system might under certain conditions become that of the check valves rather than that of the plugs. As it is impossible commercially to assemble such check valves with the spring tension the same in all of them, in such a system a few of the bearings that happen to have check valves with less resistance to flow would receive much more than their share of the lubricant, and the others less. One or two bearings that happened to have valves of greatest resistance might be entirely without lubricant, while the rest of the system took it all.

In the use of the valve shown, which has a resistance to flow that can only be measured in fractions of an ounce per square inch, the system need not carry more than one pound per square inch pressure to make the distribution of the lubricant dependent on the resistance properties of the plugs 158 and substantially independent of the check valves. With a valve of such small total resistance to flow, it will be obvious that the differences between the resistance of the different valves will be of a still smaller order of magnitude and entirely immaterial. In fact, I find it practicable, to slightly increase the valve resistance and the reliability of the valve in closing by adding a very weak metallic spring 171 bearing lightly on the leaf 172. In either case, the engagement between the leaf 172 and its seat, is almost entirely a function of the pressure difference on opposite faces of the valve, such pressure difference being so much larger than, and out of all proportion to the tendency of the valve to seat itself, as to be practically the sole factor determining the operation.

The pressure developed during operation in a system according to the invention, may vary over a wide range under different climatic conditions. Thus on a cold day in winter the prevailing pressure in the piping may well be ten times that obtaining on a hot day in summer. The pump shown will deliver almost the same amount of oil in passing over a given road surface at a given speed, working against one hundred pounds pressure, as it will when working against two pounds pressure, so that the proper amount of lubricant will reach each bearing under either condition. At the same time there is an automatic increase in the supply upon an increase in the jolting of the vehicle.

Without further elaboration, the foregoing will so fully explain the gist of my invention, that others may, by applying current knowledge, readily adapt the same for use under various conditions of service, without eliminating certain features which may properly be said to constitute the essential items of novelty involved, which items are intended to be defined and secured to me by the following claims.

I claim:

1. The combination with a mechanism comprising movable parts and bearings to be lubricated, of means for lubricating said bearings comprising a fitting secured to each bearing and having a passage-way therethrough, the resistance of which is large as compared with the resistance of one of said bearings, a single conduit for supplying lubricant to said fittings, said conduit having a branch leading to each of said fittings, means for supplying lubricant to said conduit comprising a reciprocating pump actuated by the movement of one of said movable parts, said pump including means for accumulating energy over a period of time and then expending said energy in a comparatively short period of time for forcing lubricant from said pump, and means for preventing return flow of lubricant through said conduit, the capacity of the pump and the frequency of its charges being proportioned to maintain continuous pressure in said conduit without forcing an objectionable amount of oil into said bearings.

2. The combination with a mechanism comprising movable parts and bearings to be lubricated, of means for lubricating said bearings comprising a fitting secured to each bearing and having a passage-way therethrough, the resistance of which is large as compared with the resistance of one of said bearings, a single conduit for supplying lubricant to said fittings, said conduit having a branch leading to each of said fittings, means for supplying lubricant to said conduit comprising a reciprocating pump actuated by an inertia weight propelled mechanism movably mounted upon one of said movable parts, said pump including means for accumulating energy over a period of time and then expending said energy in a comparatively short period of time for forcing the charge of lubricant from said pump, and means in each branch for preventing return flow of lubricant through said branch.

3. The combination with a mechanism comprising movable parts and bearings to be lubricated, of means for lubricating said bearings comprising a fitting secured to each bearing and having a passageway therethrough, the resistance of which is large as compared with the resistance of one of said bearings, a single conduit for supplying lubricant to said fittings, said conduit having a branch leading to each of said fittings, means for supplying lubricant to said conduit comprising a reciprocating pump actuated by the movement of one of said movable parts, said pump including a plunger and means for driving said plunger with a slow intake stroke and a quick discharge stroke, and means for preventing return flow of lubricant through said conduit, the capacity of the pump and the frequency of its charges being proportioned to maintain continuous pressure in said conduit without forcing an objectionable amount of oil into said bearings.

4. A lubricating system comprising a plurality of bearings on a machine to be lubricated, conduits for supplying lubricant to said bearings, a pump for forcing lubricant into said conduits, and means for actuating said pump comprising an inertia weight operated by movement of the machine, means for storing the energy developed by said weight, and means for suddenly releasing the energy to actuate said pump.

5. A lubricating system comprising a plurality of bearings on a machine to be lubricated, conduits for conducting lubricant to said bearings, resistance units in said conduits adjacent each bearing, a pump for forcing lubricant into said conduits, and means for actuating said pump comprising an inertia weight operated by the movement of the machine, means for storing the energy developed by said weight, and means for suddenly releasing the energy to actuate said pump.

6. A lubricating system comprising a plurality of bearings on a machine to be lubricated, conduits for supplying lubricant to said bearings, resistance units in said conduits adjacent each bearing, a spring pressed plunger pump for forcing lubricant into said conduits, inertia operated power means for gradually moving said plunger against the force of its spring, and means for suddenly releasing said plunger permitting the spring to actuate said plunger and thereby force lubricant into said conduits.

In witness whereof, I hereunto subscribe my name this 25th day of November, 1925.

ERNEST W. DAVIS.